US011186076B2

(12) United States Patent
Nakagawa et al.

(10) Patent No.: US 11,186,076 B2
(45) Date of Patent: Nov. 30, 2021

(54) METHOD OF MANUFACTURING ELECTRICAL STEEL SHEET WITH ADHESIVE INSULATING COATING AND METHOD OF MANUFACTURING STACKED ELECTRICAL STEEL SHEET

(71) Applicant: JFE STEEL CORPORATION, Tokyo (JP)

(72) Inventors: Nobuko Nakagawa, Tokyo (JP); Naoki Muramatsu, Tokyo (JP); Chiyoko Tada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 181 days.

(21) Appl. No.: 16/471,774

(22) PCT Filed: Dec. 11, 2017

(86) PCT No.: PCT/JP2017/044322
§ 371 (c)(1),
(2) Date: Jun. 20, 2019

(87) PCT Pub. No.: WO2018/116881
PCT Pub. Date: Jun. 28, 2018

(65) Prior Publication Data
US 2020/0086619 A1 Mar. 19, 2020

(30) Foreign Application Priority Data
Dec. 22, 2016 (JP) .............................. JP2016-249600
Oct. 2, 2017 (JP) .............................. JP2017-192787

(51) Int. Cl.
B32B 37/12 (2006.01)
B23P 19/04 (2006.01)
B32B 7/12 (2006.01)
B32B 15/01 (2006.01)
H02K 15/02 (2006.01)

(52) U.S. Cl.
CPC .............. B32B 37/12 (2013.01); B23P 19/04 (2013.01); B32B 7/12 (2013.01); B32B 15/011 (2013.01); H02K 15/02 (2013.01); B32B 2037/1253 (2013.01); B32B 2255/06 (2013.01); B32B 2255/26 (2013.01); B32B 2307/206 (2013.01)

(58) Field of Classification Search
CPC .............. B32B 2307/206; B32B 37/12; B32B 2255/26; B32B 7/12; B32B 2255/06; B32B 15/092; B32B 2037/1253; C09D 163/00; H01F 1/147; B23P 19/04; H02K 15/02; C23C 26/00
See application file for complete search history.

(56) References Cited

U.S. PATENT DOCUMENTS

2014/0302311 A1* 10/2014 Yoo .................. C09D 5/103
428/336
2015/0044475 A1   2/2015 Nakagawa et al.
2016/0121421 A1*  5/2016 Uhm ................. B23K 9/23
310/216.004
2016/0230024 A1*  8/2016 Nakagawa ........... C09D 5/084

FOREIGN PATENT DOCUMENTS

| CN | 1568528 A | 1/2005 |
|---|---|---|
| CN | 104169467 A | 11/2014 |
| EP | 1805260 B1 | 10/2009 |
| EP | 2821523 A1 | 1/2015 |
| JP | H06330231 A | 11/1994 |
| JP | H07201551 A | 8/1995 |
| JP | H07256206 A | 10/1995 |
| JP | H07336969 A | 12/1995 |
| JP | H11162724 A | 6/1999 |
| JP | 2000173815 A | 6/2000 |
| JP | 5129573 B2 | 1/2013 |
| KR | 1020140119771 A | 10/2014 |
| WO | 2008154122 A1 | 12/2008 |
| WO | 2015029828 A1 | 3/2015 |
| WO | WO-2015029828 A1 * | 3/2015 ............... C09D 7/61 |

OTHER PUBLICATIONS

Jan. 23, 2017, International Search Report issued in the International Patent Application No. PCT/JP2017/044322.
Oct. 10, 2020, Office Action issued by the China National Intellectual Property Administration in the corresponding Chinese Patent Application No. 201780078009.6 with English language concise statement of relevance.
Oct. 17, 2019, the Extended European Search Report issued by the European Patent Office in the corresponding European Patent Application No. 17882396.9.
Jan. 15, 2021, Office Action issued by the Korean Intellectual Property Office in the corresponding Korean Patent Application No. 10-2019-7017450 with English language concise statement of relevance.

(Continued)

Primary Examiner — Vishal I Patel
(74) Attorney, Agent, or Firm — Kenja IP Law PC

(57) ABSTRACT

Provided is a method of manufacturing an electrical steel sheet with an adhesive insulating coating that has excellent high-temperature adhesive property and high-temperature oil resistance and, even after being stacked and subjected to stress relief annealing, has excellent magnetic properties (iron loss, magnetic flux density). The method comprises: applying a coating material to at least one side of an electrical steel sheet, the coating material containing (a) an aqueous epoxy resin, (b) a high-temperature hardening crosslinking agent in an amount of 30 parts by mass or less with respect to 100 parts by mass of the aqueous epoxy resin, in terms of solid content, (c) metal oxide particles, and (d) a solvent; and baking the coating material applied to the electrical steel sheet, under a condition of a peak steel sheet temperature of 150° C. or more and less than 230° C.

8 Claims, No Drawings

(56) References Cited

OTHER PUBLICATIONS

Mar. 30, 2021, Office Action issued by the China National Intellectual Property Administration in the corresponding Chinese Patent Application No. 201780078009.6 with English language concise statement of relevance.
Coating Technology Editorial Committee Chemical Industry Press, Paint Process, 1997, pp. 643-644.
Jul. 7, 2021, Office Action issued by the Korean Intellectual Property Office in the corresponding Korean Patent Application No. 10-2019-7017450 with English language concise statement of relevance.

* cited by examiner

METHOD OF MANUFACTURING ELECTRICAL STEEL SHEET WITH ADHESIVE INSULATING COATING AND METHOD OF MANUFACTURING STACKED ELECTRICAL STEEL SHEET

TECHNICAL FIELD

The present disclosure relates to a method of manufacturing an electrical steel sheet with an adhesive insulating coating suitable as a material of a stacked iron core for an automotive motor and the like. The present disclosure also relates to a method of manufacturing a stacked electrical steel sheet using the electrical steel sheet with an adhesive insulating coating.

BACKGROUND

A stacked electrical steel sheet used for an iron core of electrical equipment and the like has conventionally been manufactured by stacking a plurality of electrical steel sheets having insulating coatings and then integrating the electrical steel sheets by a method such as caulking or welding. The growing demand for more efficient electrical equipment to save energy in recent years has fostered the tendency to reduce the sheet thickness of steel sheets used in a stacked electrical steel sheet in order to reduce eddy current loss. In the case where the steel sheets are thin, however, not only caulking or welding is difficult, but also the stacked end surfaces separate easily, making it hard to keep the shape as an iron core.

To solve this problem, a technique of forming a stacked electrical steel sheet by thermocompression-bonding electrical steel sheets each of which has an adhesive insulating coating on its surface, instead of integrating steel sheets by caulking or welding, has been proposed.

For example, JP H6-330231 A (PTL 1) proposes a technique of improving adhesive strength during stacking by forming a specific roughness pattern on the surface of an electrical steel sheet for an adhesive stacked iron core which is an electrical steel sheet having an adhesive insulating coating on its surface.

JP H7-201551 A (PTL 2) proposes a technique of improving blanking workability by setting the average grain size d of the surface of each steel sheet in a stacked electrical steel sheet to d 20n (n is the number of steel sheets). By increasing the average grain size d, crystal grain boundaries which cause lower blanking workability of the stacked electrical steel sheet can be reduced to improve blanking workability.

JP 2000-173815 A (PTL 3) proposes a stacked electrical steel sheet with a shear adhesive strength of 50 kgf/cm$^2$ or more at ordinary temperature. The shear adhesive strength of the stacked electrical steel sheet is increased to prevent a displacement or peeling of steel sheets which may occur during blanking.

JP 5129573 B2 (PTL 4) proposes a technique of forming an adhesive coating on the surface of an electrical steel sheet using a coating material containing an epoxy resin, reactive nanoparticles based on a silicon-oxygen network, and a hardener.

CITATION LIST

Patent Literatures

PTL 1: JP H6-330231 A
PTL 2: JP H7-201551 A
PTL 3: JP 2000-173815 A
PTL 4: JP 5129573 B2

SUMMARY

Technical Problem

Electrical steel sheets with adhesive insulating coatings as described in each of PTL 1 to PTL 4 can be stacked and heated and pressed to form a stacked electrical steel sheet. However, to use such a stacked electrical steel sheet as an iron core for an automotive motor which has been in rapidly increasing demand in recent years, further performance improvement is required as described below.

For example, an automotive motor is used in a high-temperature environment of about 180° C. A stacked electrical steel sheet used in the iron core of the automotive motor therefore needs to have excellent adhesive property at high temperature. Thus, each electrical steel sheet with an adhesive insulating coating used in the manufacture of the stacked electrical steel sheet is required to have excellent adhesive property in a high-temperature environment (hereafter referred to as "high-temperature adhesive property"). The conventional techniques as described in PTL 1 to PTL 3 do not sufficiently take into account this high-temperature adhesive property. For example, PTL 3 merely evaluates the shear adhesive strength of the stacked electrical steel sheet at ordinary temperature (20° C.).

Moreover, the iron core for an automotive motor is not simply used in a high-temperature environment, but used in high-temperature oil. Accordingly, each electrical steel sheet with an adhesive insulating coating is required to have a property of being usable stably for a long time in high-temperature oil (hereafter referred to as "high-temperature oil resistance") in a state of a stacked electrical steel sheet obtained by stacking these electrical steel sheets with adhesive insulating coatings.

It has been conventionally considered that, because electrical steel sheets with adhesive insulating coatings are integrated by being stacked and heated and pressed, stress relief annealing is unnecessary unlike in the case where electrical steel sheets are integrated by caulking or welding. For more reliable integration of the stacked electrical steel sheet, however, it has been proposed that, even in the case of using electrical steel sheets with adhesive insulating coatings, caulking or welding is performed after stacking and heating and pressing the electrical steel sheets with adhesive insulating coatings. In such a case, after caulking or welding, stress relief annealing needs to be performed in order to relieve stress which causes a decrease in magnetic properties.

However, since stress relief annealing is performed at high temperature such as 750° C., a component such as a resin contained in the adhesive insulating coating may decompose. If the structural component in the adhesive insulating coating decomposes, the insulation property between the electrical steel sheets stacked together decreases, as a result of which eddy current loss increases and magnetic property (iron loss) as an iron core degrades.

Although the adhesive property and the insulation property can be improved by thickening the adhesive insulating coating, if the adhesive insulating coating is made thicker, the ratio of the electrical steel sheets to the stacked electrical steel sheet, namely, "stacking factor", decreases, and consequently the magnetic flux density of the stacked electrical steel sheet decreases. Meanwhile, if the adhesive insulating coating is made thinner in order to improve the stacking factor, sufficient adhesive strength cannot be obtained, and the insulation property of the stacked electrical steel sheet especially after stress relief annealing cannot be ensured. Thus, it has been impossible so far to achieve both low iron loss and high stacking factor in a stacked electrical steel sheet after stress relief annealing.

It could therefore be helpful to provide a method of manufacturing an electrical steel sheet with an adhesive insulating coating that has excellent high-temperature adhesive property and high-temperature oil resistance and, even after being stacked and subjected to stress relief annealing, has excellent iron loss and stacking factor. It could also be helpful to provide a method of manufacturing a stacked electrical steel sheet using the electrical steel sheet with an adhesive insulating coating.

Solution to Problem

We provide the following:
1. A method of manufacturing an electrical steel sheet with an adhesive insulating coating, the method comprising: applying a coating material to at least one side of an electrical steel sheet, the coating material containing (a) an aqueous epoxy resin, (b) a high-temperature hardening crosslinking agent in an amount of 30 parts by mass or less with respect to 100 parts by mass of the aqueous epoxy resin, in terms of solid content, (c) metal oxide particles, and (d) a solvent; and baking the coating material applied to the electrical steel sheet, under a condition of a peak steel sheet temperature of 150° C. or more and less than 230° C.
2. The method of manufacturing an electrical steel sheet with an adhesive insulating coating according to 1, wherein a hardening temperature of a mixture of (a) the aqueous epoxy resin and (b) the high-temperature hardening crosslinking agent is 150° C. or more.
3. The method of manufacturing an electrical steel sheet with an adhesive insulating coating according to 1. or 2, wherein a content of (c) the metal oxide particles in the coating material in terms of solid content is less than 0.1 parts by mass with respect to 100 parts by mass of the aqueous epoxy resin.
4. A method of manufacturing a stacked electrical steel sheet, the method comprising: stacking a plurality of electrical steel sheets with adhesive insulating coatings obtained by the method of manufacturing an electrical steel sheet with an adhesive insulating coating according to any one of 1. to 3; and thereafter heating and pressing the plurality of electrical steel sheets stacked.

Advantageous Effect

It is thus possible to obtain an electrical steel sheet with an adhesive insulating coating that has excellent high-temperature adhesive property and high-temperature oil resistance and, even after being stacked and subjected to stress relief annealing, has excellent iron loss and stacking factor. It is also possible to obtain a stacked electrical steel sheet by stacking such electrical steel sheets with adhesive insulating coatings.

DETAILED DESCRIPTION (Manufacture of Electrical Steel Sheet with Adhesive Insulating Coating)

In one of the disclosed embodiments, a coating material containing the above-described components is applied to at least one side of an electrical steel sheet and baked, to form an adhesive insulating coating (hereafter also simply referred to as "insulating coating"). The coating material used in the formation of the insulating coating will be described below.

[Coating Material]

In one of the disclosed embodiments, the coating material containing the following components as essential components is used:
(a) an aqueous (waterborne) epoxy resin,
(b) a high-temperature hardening crosslinking agent,
(c) metal oxide particles, and
(d) a solvent.

(a) Aqueous Epoxy Resin

The aqueous epoxy resin is not limited, and may be any aqueous epoxy resin (prepolymer). For example, one or more selected from the group consisting of bisphenol A type, bisphenol F type, aliphatic type, and glycidyl amine type can be used as the aqueous epoxy resin. Epoxy resin has excellent heat resistance. Therefore, the use of epoxy resin can improve the high-temperature adhesive property and the high-temperature oil resistance. Moreover, since aqueous epoxy resin is used, an aqueous solvent can be used as the below-described solvent, with there being no need to use a large amount of organic solvent.

The content of the aqueous epoxy resin in the coating material is not limited, and may be any value. However, if the content of the aqueous epoxy resin is excessively low, the adhesive property decreases, and sufficient high-temperature adhesive property and high-temperature oil resistance may not be achieved. Accordingly, the content of the aqueous epoxy resin in the coating material is preferably 50 mass % or more, more preferably 60 mass % or more, and further preferably 70 mass % or more, with respect to the total solid content.

(b) High-Temperature Hardening Crosslinking Agent

The high-temperature hardening crosslinking agent (hereafter also simply referred to as "crosslinking agent" or "hardener") may be any one or more high-temperature hardeners capable of crosslinking the aqueous epoxy resin.

The hardening temperature of a mixture of (a) the aqueous epoxy resin and (b) the high-temperature hardening crosslinking agent is preferably 150° C. or more. No upper limit is placed on the hardening temperature. If the hardening temperature is more than 200° C., however, hardening during coating baking is insufficient, which may make coiling impossible and hinder manufacturing. The hardening temperature is therefore preferably 200° C. or less.

The "hardening temperature" herein is a temperature at which the viscoelasticity measured by a rigid-body pendulum type physical properties testing instrument decreases as a result of hardening. When a crosslinked structure develops as the hardening reaction proceeds, the movement of the pendulum is restricted, and the swing cycle of the pendulum decreases suddenly. Hence, the hardening temperature can be determined based on changes in the swing cycle of the pendulum.

Examples of the high-temperature hardening crosslinking agent include aromatic amines, dicyandiamide, and blocked isocyanate. The use of the high-temperature hardening crosslinking agent can prevent excessive hardening of the resin in the baking. Accordingly, when stacking the resultant electrical steel sheets with adhesive insulating coatings and heating and pressing them to manufacture a stacked electrical steel sheet, the hardening reaction can be facilitated, so that the high-temperature adhesive property and the high-temperature oil resistance can be ensured at high level.

If the content of the crosslinking agent is excessively high, the adhesive property decreases. Accordingly, the content of the crosslinking agent in the coating material in terms of solid content is 30 parts by mass or less with respect to 100 parts by mass of the aqueous epoxy resin. No lower limit is placed on the content of the crosslinking agent. In terms of achieving sufficient crosslinking agent addition effect, however, the content of the crosslinking agent in terms of solid content is preferably 1 part by mass or more and more preferably 2 parts by mass or more with respect to 100 parts by mass of the aqueous epoxy resin.

(c) Metal Oxide Particles

Since stress relief annealing for the stacked electrical steel sheet is performed at high temperature such as 750° C., at least part of the resin which is an organic component decomposes, and the insulation property between the electrical steel sheets stacked together decreases, as mentioned above. In view of this, metal oxide particles which are an inorganic component are added to the coating material. The metal oxide particles remain without being decomposed even after stress relief annealing, thus preventing a decrease in insulation property.

The metal oxide particles are not limited, and may be particles of any metal oxide. Particles of one metal oxide may be used alone, or particles of two or more metal oxides may be used in combination. Examples of metal oxides that are suitable include silica, alumina, titania, and zirconia.

The content of the metal oxide particles in the coating material is not limited, and may be any value. If the content of the metal oxide particles is excessively high, however, the proportion of the epoxy resin in the resultant insulating coating decreases relatively, which may cause decreases in high-temperature adhesive property and high-temperature oil resistance. Accordingly, the content of the metal oxide particles in the coating material in terms of solid content is preferably less than 0.10 parts by mass and more preferably 0.08 parts by mass or less with respect to 100 parts by mass of the aqueous epoxy resin. In terms of achieving sufficient metal oxide particle addition effect, the content of the metal oxide particles in the coating material in terms of solid content is preferably 0.001 parts by mass or more and more preferably 0.01 parts by mass or more with respect to 100 parts by mass of the aqueous epoxy resin.

(d) Solvent

The solvent may be any solvent capable of dissolving or dispersing each component contained in the coating material. A typical solvent is water or a mixed solvent of water and an organic solvent, and water is preferably used.

(e) Additive

While the coating material consists of the foregoing components (a) to (d) can be used in one of the disclosed embodiments, other (e) additive (or additives, hereafter the same) may be optionally contained without undermining the effects of the present disclosure.

As the additive, for example, one or more of a defoamer, a surfactant, a neutralizer, a corrosion inhibitor, a lubricant, an antioxidant, and a hardening accelerator such as an organometallic compound, which are added to further improve the performance or homogeneity of the coating, may be used. The total content of the additive in the coating material is preferably 5 mass % or less with respect to the total solid content of the coating material, in terms of maintaining sufficient coating performance.

The method of preparing the coating material is not limited, and may be any method. For example, the coating material can be prepared by adding (c) the metal oxide particles, (d) the solvent, and optionally (e) the additive while stirring (a) the aqueous epoxy resin and (b) the crosslinking agent using a stirrer.

[Electrical Steel Sheet]

The type of electrical steel sheet used in the present disclosure is not limited. The electrical steel sheet may be any of a soft iron sheet (electrical core sheet) having high magnetic flux density, an ordinary cold-rolled steel sheet such as SPCC defined in JIS G 3141 (2009), a non-oriented electrical steel sheet containing Si or Al to increase specific resistance, etc.

The thickness (sheet thickness) of the electrical steel sheet used is not limited. When the electrical steel sheet is thin, the iron loss is low. However, if the electrical steel sheet is excessively thin, not only the shape stability decreases, but also the electrical steel sheet manufacturing cost increases. Accordingly, the thickness of the electrical steel sheet used is preferably 50 μm or more. On the other hand, when the electrical steel sheet is thicker, the iron loss is higher. Moreover, thick electrical steel sheets can be integrated by caulking or welding without using adhesive coatings. Accordingly, the sheet thickness is preferably 1 mm or less, more preferably 0.5 mm or less, and further preferably 0.3 mm or less.

Pretreatment for the electrical steel sheet as the material is not limited. Although an untreated steel sheet may be used, it is preferable to subject the steel sheet to degreasing such as alkali degreasing or pickling using an acid such as hydrochloric acid, sulfuric acid, or phosphoric acid, before applying the coating material.

[Application]

The coating material having the foregoing composition is applied to the surface of the electrical steel sheet. The method of applying the coating material is not limited, and may be any method. For example, the coating material may be applied using industrially common equipment such as a roll coater, a flow coater, a spray coater, a knife coater, or a bar coater.

The coating material may be applied to at least one side of the electrical steel sheet. Whether to form the insulating coating on one side or both sides of the electrical steel sheet may be determined as appropriate depending on the properties and use required of the electrical steel sheet. An insulating coating made of the coating material may be formed on one side of the electrical steel sheet, and an insulating coating made of another coating material on the other side of the electrical steel sheet.

[Baking]

After applying the coating material to the surface of the electrical steel sheet, the coating material is baked to form an adhesive insulating coating. The baking method is not limited, and may be any typical method such as hot-air heating, infrared heating, or induction heating.

Peak steel sheet temperature: 150° C. or more and less than 230° C.

If the peak steel sheet temperature in the baking is less than 150° C., the crosslinking reaction between the epoxy resin and the crosslinking agent dos not proceed sufficiently, and consequently sufficient high-temperature adhesive property cannot be achieved. The peak steel sheet temperature is therefore 150° C. or more. The peak steel sheet temperature is preferably 160° C. or more, more preferably 170° C. or more, and further preferably 180° C. or more. If the peak steel sheet temperature is 230° C. or more, the resin hardens excessively in the baking. This causes poor hardening reaction subsequently when stacking and heating and pressing the electrical steel sheets with adhesive insulating coatings, and results in decreases in high-temperature adhesive property and high-temperature oil resistance. The peak steel sheet temperature is therefore less than 230° C. The peak steel sheet temperature is preferably 225° C. or less, and more preferably 220° C. or less.

The baking time in the baking, i.e. the time from when heating starts to when the peak steel sheet temperature is reached, is not limited, but is preferably 10 seconds to 60 seconds. After reaching the peak steel sheet temperature, the electrical steel sheet is preferably cooled to room temperature, without being limited thereto.

[Thickness]

The thickness of the coating material applied is not limited, but is determined so as to achieve sufficient adhesive strength and especially sufficient high-temperature adhesive property in the resultant stacked electrical steel sheet. Specifically, for use as an iron core of an automotive motor, the shear adhesive strength at 180° C. is preferably 1.96 MPa (=20 kgf/cm$^2$) or more. The shear adhesive strength at 180° C. can be measured by the method described in the EXAMPLES section.

In view of the above, the film thickness of the adhesive insulating coating after the baking is preferably 1.0 μm or more, and more preferably 2.0 μm or more. On the other hand, if the film thickness reaches a certain point, the effect of increasing the shear adhesive strength by increasing the film thickness is saturated. In addition, the coating material cost increases as the film thickness increases. Besides, if the film thickness of the insulating coating increases, the stacking factor in the stacked electrical steel sheet decreases, and as a result the magnetic flux density of the stacked electrical steel sheet decreases. Accordingly, the film thickness of the insulating coating after the baking is preferably 20 μm or less, more preferably 10 μm or less, and further preferably 5 μm or less. Hence, in the application, the composition is preferably applied so that the film thickness after the baking is in the foregoing range.

(Manufacture of Stacked Electrical Steel Sheet)

A plurality of electrical steel sheets with adhesive insulating coatings obtained in this way are stacked and then heated and pressed to yield a stacked electrical steel sheet.

[Stacking]

The number of steel sheets stacked is not limited, and may be any number. The number of steel sheets stacked is preferably 40 or more, and more preferably 50 or more. The number of steel sheets stacked is preferably 300 or less, and more preferably 200 or less.

[Heating and Pressing]

The electrical steel sheets with adhesive insulating coatings stacked are then heated and pressed to be integrated. The unhardened resin component in the insulating coating is thus hardened. Hence, complete hardening is achieved with no unreacted linking groups remaining in the coating, ensuring the adhesive strength of the stacked electrical steel sheet. The heating temperature in the heating and pressing treatment is preferably 100° C. or more. The heating temperature is preferably 250° C. or less. The pressure in the heating and pressing treatment is preferably 0.49 MPa (=5 kgf/cm$^2$) or more. The pressure is preferably 4.90 MPa (=50 kgf/cm$^2$) or less. The time of the heating and pressing treatment is preferably 5 minutes or more. The time is preferably 48 hours or less.

The total thickness of the stacked electrical steel sheet after the heating and pressing treatment is preferably 2 mm or more. The total thickness is preferably less than 300 mm. If the total thickness is 2 mm or more, the effects of low iron loss and high magnetic flux density which are the features of the electrical steel sheets are sufficient. If the total thickness is less than 300 mm, the stacked material is manufactured easily in a heating and pressing jig, which improves the manufacturing efficiency of the stacked electrical steel sheet.

EXAMPLES

The advantageous effects of the present disclosure will be described in detail below based on examples, although the present disclosure is not limited to these examples.

<Manufacture of Electrical Steel Sheet with Adhesive Insulating Coating>

Steel sheets with a size of 150 mm in width and 300 mm in length were cut from non-oriented electrical steel sheets with sheet thicknesses shown in Table 1, and used as samples. The electrical steel sheets as the samples were each immersed in an ordinary-temperature sodium orthosilicate solution (0.8 mass % in concentration) for 30 seconds, and then washed with water and subsequently dried.

A coating material was applied to the surface (both sides) of this pretreated sample using a roll coater, and then baked in a hot-air baking oven. As the coating material, a coating material containing the components shown in Table 1 and water as a solvent was used. The peak steel sheet temperature and the baking time (the time from when heating starts to when the peak steel sheet temperature is reached) in the baking are shown in Table 1. After reaching the peak steel sheet temperature, the sample was taken out of the oven and allowed to cool at room temperature, thus obtaining an electrical steel sheet with an adhesive insulating coating. The film thickness of the adhesive insulating coating after the baking is shown in Table 1. The components contained in the coating material are as follows.

(a) Aqueous Epoxy Resin a1: jER 825 (bisphenol A type) produced by Mitsubishi Chemical Corporation a2: EPICLON 835 (bisphenol F type) produced by DIC Corporation (b) Crosslinking Agent b1: BURNOCK D-500 (blocked isocyanate type) produced by DIC Corporation b2: EH-3636AS (dicyandiamide type) produced by ADEKA Corporation b3: EPICURE 8290-Y-60 (aliphatic polyamine-based) produced by Japan Chemtech Ltd.

Hardening temperature of mixture of a1 and b1: 150° C.
Hardening temperature of mixture of a2 and b1: 150° C.
Hardening temperature of mixture of a1 and b2: 170° C.
Hardening temperature of mixture of a2 and b2: 170° C.
Hardening temperature of mixture of a1 and b3: 30° C.
Hardening temperature of mixture of a2 and b3: 30° C.

The hardening temperature was evaluated by viscoelasticity measurement using a rigid-body pendulum type physical properties testing instrument (RPT-3000W produced by A&D Company, Limited). The change of viscoelasticity as a result of hardening of the coating film composed of the crosslinking agent and the aqueous epoxy resin was measured, and the temperature at which the swing cycle of the pendulum (edge type) decreased suddenly was taken to be the hardening temperature.

(c) Metal Oxide Particles c1: EP (zirconium oxide) produced by Daiichi Kigenso Kagaku Kogyo Co., Ltd.

c2: TTO-55 (D) (titanium oxide fine particles) produced by Ishihara Sangyo Kaisha, Ltd.

(e) Additive e1: SURFYNOL 400 (defoamer) produced by Nissin Chemical Industry Co., Ltd.

e2: KM-7750 (defoamer) produced by Shin-Etsu Chemical Co., Ltd.

e3: DYNOL 604 (surfactant) produced by Nissin Chemical Industry Co., Ltd.

<High-Temperature Adhesive Property>

To evaluate the high-temperature adhesive property of the electrical steel sheet with an adhesive insulating coating obtained in the above-described way, the shear adhesive strength at 180° C. was measured. The evaluation method and the evaluation criteria are as follows.

Shear tensile test pieces were made according to JIS K 6850: 1999, and subjected to a tensile test. Two electrical steel sheets (25 mm in width×100 mm in length) with adhesive insulating coatings obtained as a result of the baking were stacked in a state of being displaced so that their insulating coatings bonded to each other in the part of up to 10 mm from the end (lap part: 25 mm in width×10 mm), and subjected to heating and pressing treatment under the conditions of 200° C. in temperature, 1.96 MPa (=20 kgf/cm$^2$) in pressure, and 1 hour in treatment time, to produce each shear tensile test piece. Setting the tensile test environment to 180° C., the test piece was held at this temperature for 10 minutes, and then the test was conducted while maintaining the temperature. The test rate was 3 mm/min. The measured tensile strength was determined based on the following criteria.

(Criteria)

Excellent: 2.94 MPa or more
Good: 1.96 MPa or more and less than 2.94 MPa
Fair: 0.98 MPa or more and less than 1.96 MPa
Poor: 0.49 MPa or more and less than 0.98 MPa
Very poor: less than 0.49 MPa <Manufacture of Stacked Electrical Steel Sheet>

Next, five electrical steel sheets with adhesive insulating coatings were stacked and subjected to heating and pressing treatment in which heating and pressing are simultaneously performed, to produce a stacked electrical steel sheet. The conditions of the heating and pressing treatment were 200° C. in heating temperature, 1.96 MPa (=20 kgf/cm$^2$) in pressure, and 1 hour in treatment time.

<High-Temperature Oil Resistance>

For each of the obtained stacked electrical steel sheets, the high-temperature oil resistance was evaluated. The evaluation method is as follows.

The stacked electrical steel sheet was immersed in oil held at 180° C., for 500 hours. The stacked electrical steel sheet was then taken out and allowed to cool, and whether or not the stacked electrical steel sheet separated or peeled was observed. As the oil, Daphne Super Hydro 46HF produced by Idemitsu Kosan Co., Ltd. was used. The criteria are as follows.

(Criteria)

Excellent: neither separated nor peeled
Good: not separated but locally peeled
Poor: separated into two or more parts <Stress Relief Annealing>

Next, each of the stacked electrical steel sheets produced in the above-described way was subjected to stress relief annealing, in order to evaluate the properties after stress relief annealing. The conditions of the stress relief annealing were 800° C.×2 hours in 100% nitrogen. For the stacked electrical steel sheet after the stress relief annealing, the iron loss and the stacking factor were evaluated as follows.

<Iron Loss>

The stacked electrical steel sheet after the stress relief annealing in strip form of 30 mm×280 mm was set in a double-cross formation, and iron loss $W_{15/50}$ (W/kg) was evaluated by Epstein's method defined in JIS C 2550. The criteria are as follows.

(Criteria)

Excellent: $W_{15/50} \leq 6.01$ W/kg
Good: 6.01 W/kg$<W_{15/50} \leq 6.1$ W/kg
Poor: 6.1 W/kg$<W_{15/50}$ <Stacking Factor>

For each stacked electrical steel sheet after the stress relief annealing, the weight and the volume were measured, and the stacking factor was calculated according to the following formula:

$$\text{Stacking factor (\%)} = 100 \times \text{weight of stacked electrical steel sheet (g)} / (\text{volume of stacked electrical steel sheet (cm}^3\text{)} \times \text{specific gravity of steel sheet (g/cm}^3\text{))}.$$

The criteria are as follows.

(Criteria)

Excellent: 97%≤stacking factor
Good: 95%≤stacking factor<97%
Poor: stacking factor<95%

The evaluation results are shown in Table 2. As can be understood from the results, each electrical steel sheet with an adhesive insulating coating satisfying the conditions according to the present disclosure had excellent high-temperature adhesive property. Each stacked electrical steel sheet manufactured using such electrical steel sheets with adhesive insulating coatings had excellent high-temperature oil resistance, and had both excellent iron loss and excellent stacking factor even after stress relief annealing.

TABLE 1

| | Electrical steel sheet | Composition of coating material | | | | | | | |
|---|---|---|---|---|---|---|---|---|---|
| | | (a) Aqueous epoxy resin | | (b) Crosslinking agent | | (c) Metal oxide particles | | (e) Additive | | |
| No. | Sheet thickness (mm) | Product | Content *1 (mass %) | Product | Content *2 (parts by mass) | Product | Content *2 (parts by mass) | Product | Type | Content *1 (mass %) |
| 1 | 0.3 | a1 | 90 | b1 | 6 | c1 | 0.05 | e1 | Surfactant | 5 |
| 2 | 0.2 | a2 | 78 | b2 | 27 | c2 | 0.02 | e3 | Defoamer | 1 |
| 3 | 0.3 | a2 | 65 | b1 | 15 | c1 | 0.05 | e2 | Defoamer | 25 |
| 4 | 0.05 | a2 | 95 | b1 | 2 | c1 | 0.001 | e3 | Defoamer | 3.1 |
| 5 | 0.3 | a2 | 92 | b2 | 6 | c2 | 0.01 | e3 | Defoamer | 2.5 |
| 6 | 0.5 | a2 | 83 | b1 | 15 | c2 | 0.05 | e3 | Defoamer | 4.5 |
| 7 | 1.0 | a2 | 50 | b2 | 30 | c2 | 0.08 | e3 | Defoamer | 35 |
| 8 | 0.5 | a1 | 54 | b1 | 76 | c2 | 0.06 | e1 | Surfactant | 5 |

TABLE 1-continued

| | | | | | | | | | | |
|---|---|---|---|---|---|---|---|---|---|---|
| 9 | 0.3 | a1 | 72 | b1 | 35 | c2 | 0.05 | e1 | Surfactant | 2.8 |
| 10 | 0.4 | a1 | 91 | b1 | 10 | c2 | 0.07 | — | — | — |
| 11 | 0.3 | a1 | 96 | b1 | 1 | c1 | 0.05 | e1 | Surfactant | 3 |
| 12 | 0.4 | a2 | 93 | b2 | 3 | c1 | 0.06 | e2 | Defoamer | 4 |
| 13 | 0.5 | a1 | 89 | b2 | 10 | | — | e3 | Defoamer | 2 |
| 14 | 0.4 | a1 | 91 | b2 | 8 | c2 | 0.10 | e3 | Defoamer | 1.7 |
| 15 | 0.3 | a2 | 93 | b1 | 5 | c2 | 1.00 | e2 | Defoamer | 1 |
| 16 | 0.3 | a1 | 75 | b3 | 28 | c1 | 0.05 | e1 | Surfactant | 4 |
| 17 | 0.2 | a1 | 93 | b3 | 4.3 | c2 | 0.05 | e3 | Defoamer | 3 |

| | Baking conditions | | Adhesive insulating coating | |
|---|---|---|---|---|
| No. | Peak steel sheet temperature (° C.) | Baking time (sec) | Film thickness (μm) | Remarks |
| 1 | 180 | 20 | 4 | Example |
| 2 | 220 | 30 | 6 | Example |
| 3 | 225 | 20 | 4 | Example |
| 4 | 150 | 10 | 1 | Example |
| 5 | 160 | 30 | 2 | Example |
| 6 | 170 | 30 | 10 | Example |
| 7 | 220 | 60 | 20 | Example |
| 8 | 220 | 20 | 2 | Comparative Example |
| 9 | 200 | 30 | 5 | Comparative Example |
| 10 | 240 | 30 | 4 | Comparative Example |
| 11 | 190 | 20 | 5 | Example |
| 12 | 140 | 30 | 4 | Comparative Example |
| 13 | 210 | 25 | 3 | Comparative Example |
| 14 | 220 | 30 | 4 | Example |
| 15 | 190 | 30 | 3 | Example |
| 16 | 200 | 20 | 4 | Comparative Example |
| 17 | 225 | 30 | 6 | Comparative Example |

*1 Ratio to mass of total solid content in coating material
*2 Content with respect to 100 parts by mass of aqueous epoxy resin (solid content)

TABLE 2

| | Electrical steel sheet with adhesive insulating coating | Stacked electrical steel sheet | Stacked electrical steel sheet after stress relief annealing | | |
|---|---|---|---|---|---|
| No. | High-temperature adhesive property | High-temperature oil resistance | Iron loss $W_{15/50}$ (W/kg) | Stacking factor (%) | Remarks |
| 1 | Excellent | Excellent | Good | Excellent | Example |
| 2 | Good | Good | Good | Good | Example |
| 3 | Poor | Good | Good | Excellent | Example |
| 4 | Good | Good | Good | Excellent | Example |
| 5 | Excellent | Excellent | Good | Excellent | Example |
| 6 | Poor | Good | Excellent | Good | Example |
| 7 | Poor | Good | Excellent | Good | Example |
| 8 | Very poor | Poor | Excellent | Good | Comparative Example |
| 9 | Very poor | Poor | Good | Excellent | Comparative Example |
| 10 | Very poor | Poor | Excellent | Good | Comparative Example |
| 11 | Excellent | Excellent | Good | Good | Example |
| 12 | Very poor | Poor | Excellent | Good | Comparative Example |
| 13 | Excellent | Excellent | Poor | Good | Comparative Example |
| 14 | Excellent | Excellent | Good | Good | Example |
| 15 | Poor | Good | Excellent | Good | Example |
| 16 | Very poor | Poor | Good | Excellent | Comparative Example |
| 17 | Very poor | Poor | Good | Good | Comparative Example |

The invention claimed is:

1. A method of manufacturing an electrical steel sheet with an adhesive insulating coating, the method comprising:

applying a coating material to at least one side of the electrical steel sheet, the coating material containing (a) an aqueous epoxy resin, (b) a high-temperature hardening crosslinking agent in an amount of 30 parts by mass or less with respect to 100 parts by mass of the aqueous epoxy resin, in terms of solid content, (c) metal oxide particles, and (d) a solvent; and baking the coating material under a condition of a peak steel sheet temperature of 150° C. or more and less than 230° C., wherein the high-temperature hardening crosslinking agent is at least one of aromatic amines, dicyandiamide, and blocked isocyanate, and a content of (c) the metal oxide particles in the coating material in terms of solid content is 0.001 parts by mass or more and less than 0.1 parts by mass with respect to 100 parts by mass of the aqueous epoxy resin.

2. The method of manufacturing the electrical steel sheet with the adhesive insulating coating according to claim 1, wherein a hardening temperature of a mixture of (a) the aqueous epoxy resin and (b) the high-temperature hardening crosslinking agent is 150° C. or more.

3. A method of manufacturing a stacked electrical steel sheet, the method comprising:
    stacking a plurality of electrical steel sheets with adhesive insulating coatings obtained by the method of manufacturing the electrical steel sheet with the adhesive insulating coating according to claim 1; and
    thereafter heating and pressing the plurality of electrical steel sheets stacked.

4. A method of manufacturing a stacked electrical steel sheet, the method comprising:
    stacking a plurality of electrical steel sheets with adhesive insulating coatings obtained by the method of manufacturing the electrical steel sheet with the adhesive insulating coating according to claim 2; and
    thereafter heating and pressing the plurality of electrical steel sheets stacked.

5. The method of manufacturing the electrical steel sheet with the adhesive insulating coating according to claim 1, wherein (c) the metal oxide particles is at least one of silica, alumina, titania, and zirconia.

6. The method of manufacturing the electrical steel sheet with the adhesive insulating coating according to claim 5, wherein a hardening temperature of a mixture of (a) the aqueous epoxy resin and (b) the high-temperature hardening crosslinking agent is 150° C. or more.

7. A method of manufacturing a stacked electrical steel sheet, the method comprising:
    stacking a plurality of electrical steel sheets with adhesive insulating coatings obtained by the method of manufacturing the electrical steel sheet with the adhesive insulating coating according to claim 5; and
    thereafter heating and pressing the plurality of electrical steel sheets stacked.

8. A method of manufacturing a stacked electrical steel sheet, the method comprising:
    stacking a plurality of electrical steel sheets with adhesive insulating coatings obtained by the method of manufacturing the electrical steel sheet with the adhesive insulating coating according to claim 6; and
    thereafter heating and pressing the plurality of electrical steel sheets stacked.

* * * * *